United States Patent Office 3,332,819
Patented July 25, 1967

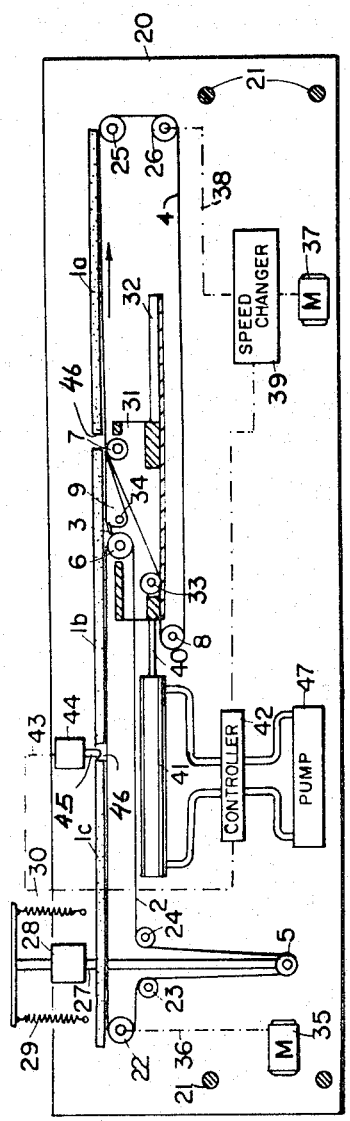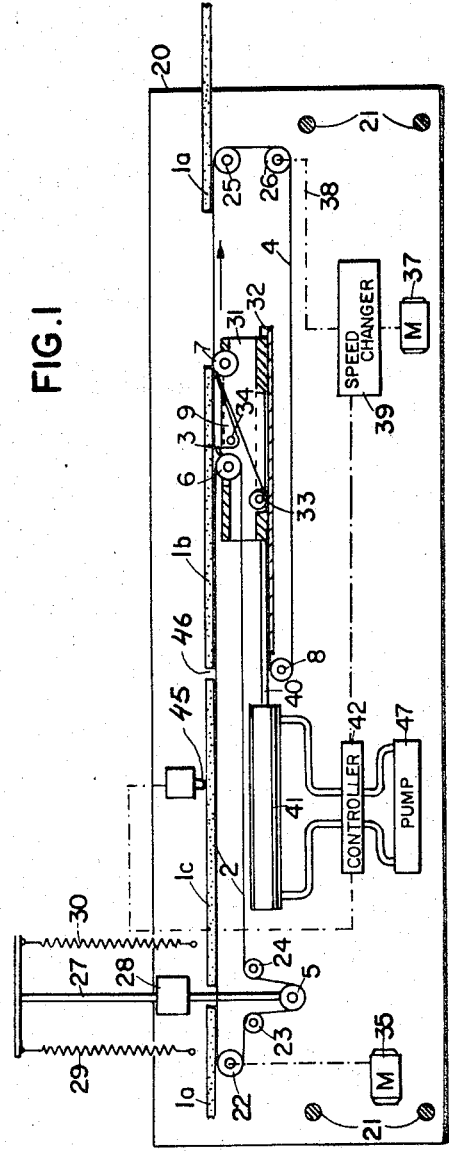

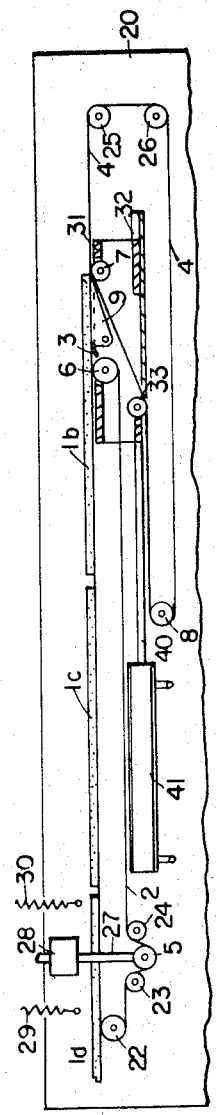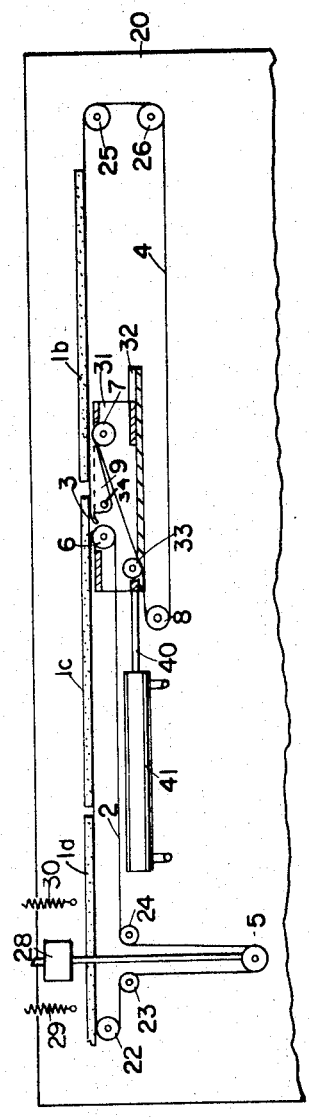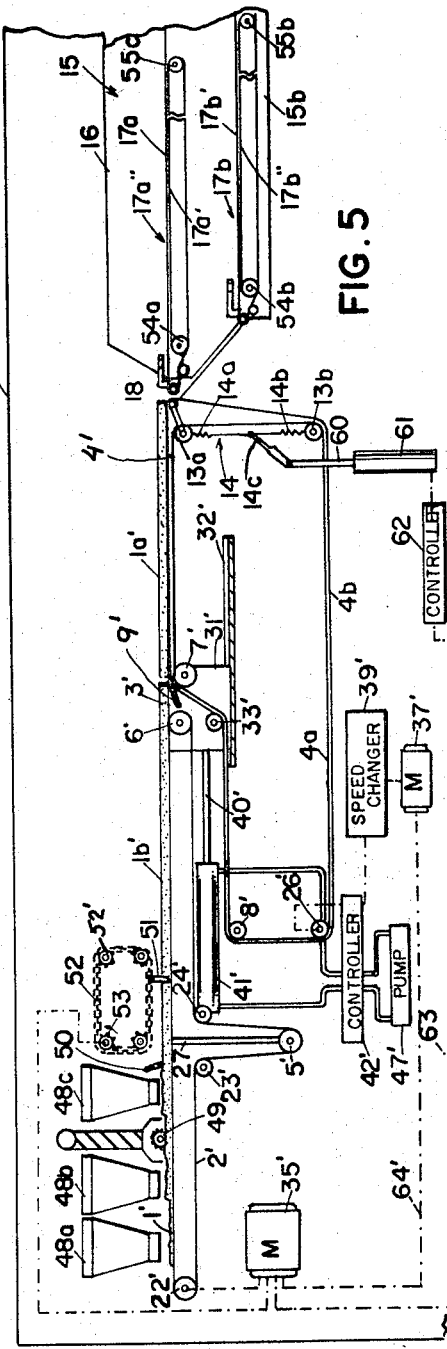
Eugen Siempelkamp
INVENTOR.
BY Karl F. Ross
Attorney

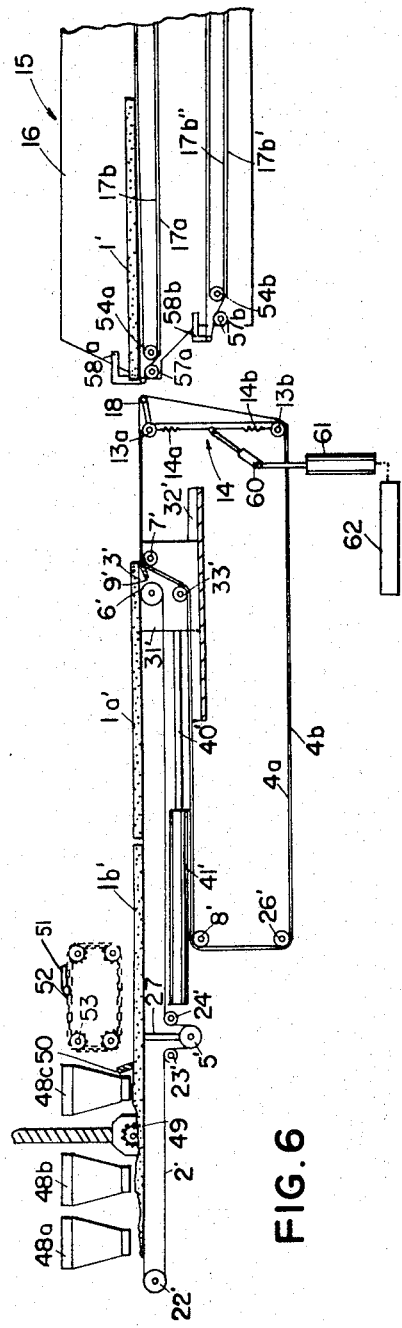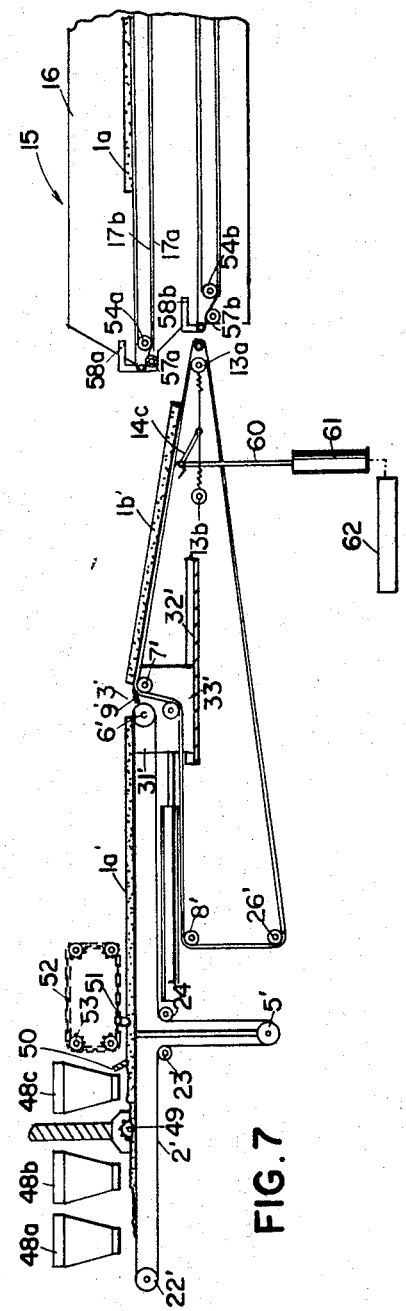

3,332,819
APPARATUS FOR SEPARATING CONVEYED SHEETS
Eugen Siempelkamp, Hohenzollernstrasse 69, Krefeld, Germany
Original application Dec. 29, 1961, Ser. No. 163,114, now Patent No. 3,224,758, dated Dec. 21, 1965. Divided and this application May 10, 1965, Ser. No. 463,064
Claims priority, application Germany, Dec. 31, 1960, S 71,905
14 Claims. (Cl. 156—375)

This application is a division of my copending application Ser. No. 163,114, filed Dec. 29, 1961 (now U.S. Patent No. 3,224,758 issued Dec. 21, 1965).

My present invention relates to an apparatus for conveying sheets of fiberboard and similar composition materials over a path leading from a point of origin to a delivery point in such manner that the spacing of the sheets is greater at the delivery point than at the origin.

In my copending application Ser. No. 835,686, filed Aug. 24, 1959 (now U.S. Patent No. 3,050,200 of Aug. 21, 1962), I have disclosed an apparatus of this character particularly designed to serve a stacking device adapted to deliver the sheets in superposed position to a multilevel press. The system described in that copending application utilizes a tilted platform onto which the sheets are delivered by a first conveyor and from which they are transported toward their destination by a second conveyor operating at a higher speed. The sheets, in sliding down the inclined platform, are accelerated from the speed of the incoming conveyor to substantially the speed of the outgoing conveyor so that their separation from one another increases progressively during their descent. In a preferred embodiment, the platform is swingable about a horizontal axis adjacent the delivery end of the incoming or primary conveyor so that its lower edges can be selectively aligned with the receiving edges of several outgoing or secondary conveyors to facilitate the distribution of the sheets to different levels of a stacking rack served by the last-mentioned conveyors.

It has been found that a system of the character described, while suitable for many types of sheet material, will not be satisfactory if the cohesion of the conveyed sheets is very low. In such instances the sheets sliding down an inclined surface are liable to experience undesirable elongation and even rupture as their forward portions are accelerated while their rear portions are still in contact with the slower-moving incoming conveyor. This is particularly true in installations where the sheets to be conveyed consist of loose particles (e.g. dampened fiber) piled directly upon the principal conveyor and smoothened into layer form without substantial preliminary compression, the resulting layer being then cut at predetermined intervals so as to be divided into a series of discrete sheets which are then successively delivered to the stacking device for consolidation in a multiplaten press.

It is, therefore, an object of my present invention to provide an improved conveying system for the purpose set forth wherein sheets of virtually any degree of coherency can be separated without danger of undue stretching or rupture.

A more specific object of the invention is to provide means in such improved conveying system for selectively delivering the separated sheets to a plurality of outgoing conveyors at different levels for distribution or stacking purposes.

In accordance with an important feature of this invention I provide, between a primary conveyor and one or more secondary conveyors or similar receiving devices, a transit conveyor adapted to be selectively operated at different speeds including a relatively low speed corresponding to that of the primary conveyor and a relatively high speed allowing for an increased separation of the oncoming sheets; if the receiving devices are secondary conveyors, their speed should substantially match the higher operating speed of the transit conveyor. At the same time I provide means for temporarily shifting the junction between the primary and transit conveyors in such manner that a sheet following another sheet already on the transit conveyor will not reach that conveyor until the latter, having accelerated to separate the sheet carried thereon from its successor, has again returned to the lower speed at which the takeover of the following sheet from the primary conveyor is possible without risk of deformation. Thus, the junction between the conveyors is so reciprocated along the plane of conveyor motion that its forward stroke occurs at substantially the operating speed of the primary conveyor whereas its return stroke, occurring at the same or a higher rate while the speed of the transit conveyor drops to its lower value, is timed to come to an end just as a further sheet on the primary conveyor approaches this junction. As the junction recedes, the transit conveyor has slipped under the second sheet and is ready to speed up as soon as the latter is no longer supported by the first conveyor.

The reciprocating displacement of the conveyor junction is most conveniently accomplished by a relative lengthening and foreshortening of the carrying surfaces of the two conveyors with concurrent displacement of the leading end of the primary conveyor and the trailing end of the transit conveyor. The displacement stroke will normally be substantially half the length of a sheet or, more generally, half the spacing between successive intersheet gaps at which separation is to occur, it being of course possible to apply the invention to systems in which groups of successive sheets rather than individual sheets are to be separated from one another.

In order to feed a plurality of superimposed pick-up conveyors acting as the receding devices for the transported goods, the transit conveyor is advantageously so designed, pursuant to another feature of the instant invention, that its output end can be selectively aligned with the several pick-up conveyors positioned therebeyond. A convenient guiding system for the band of this conveyor comprises a double-armed lever with a fixed fulcrum and a pair of rollers on the extremities of its two arms, one of these rollers defining the output end of the conveyor and being selectively positionable at the levels of the associated pick-up conveyors as the levers is swung between a substantially vertical and at least one inclined or horizontal position. The second roller, which preferably is the lower one of the two, bears upon the conveyor band only in the vertical position but extends freely toward the interior of the conveyor loop in the other position or positions. The rollers are advantageously spring-loaded to maintain the band under tension in the several positions of adjustment.

The juxtaposition of two relatively displaceable conveyor members makes it desirable to keep the radius curvature of the conveyor bands along their adjoining ends as small as possible. For structural reasons, however, the bands will generally have to be so heavy as not to flex readily around a roller or other guide element of small radius. A further feature of my invention, therefore, resides in the provision of a conveyor band composed of a pair of relatively displaceable belts or layers of which the inner one passes around a large-diameter guide roller while the outer one, which may be of substantially reduced thickness since its load-carrying capacity need not be large, embraces another roller of considerably smaller diameter positioned beyond the first-mentioned roller in the immediate vicinity of the adjoining conveyor member. Such an arrangement may be provided, for example, along the displaceable output end of the transit conveyor in a system adapted for the loading of stacked pick-up conveyors, yet the same arrangement may also be used at the junction of the primary and transit conveyors.

The system herein disclosed may be utilized in a plant in which the sheets are preformed upon being placed on the primary conveyor, as well as in an installation wherein the formation of the sheets occurs on the primary conveyor itself. In either case it will be necessary to maintain, preferably by automatic means, proper synchronism between the advance of the sheets and the reciprocation of the conveyor junction which in turn is tied to the speed changes of the transit conveyor. Such synchronism can be insured by, for example, a feeler adapted to detect the passage of a gap, as first disclosed in my copending application, or by a suitable linkage between the conveyor control and a slicing mechanism which cuts a deposited and smooth layer on the principal conveyor into discrete sheets.

The above and other objects, features and advantages of my invention will become more readily apparent from the accompanying drawing and description thereof; in the drawing:

FIGS. 1–4 illustrate in side-elevational view, somewhat diagrammatically and with parts broken away, a conveyor system representing a first embodiment of the invention, the system being illustrated in successive operating positions in the several figures;

FIGS. 5–7 are similar view showing a modified system according to the invention.

Figure 8:
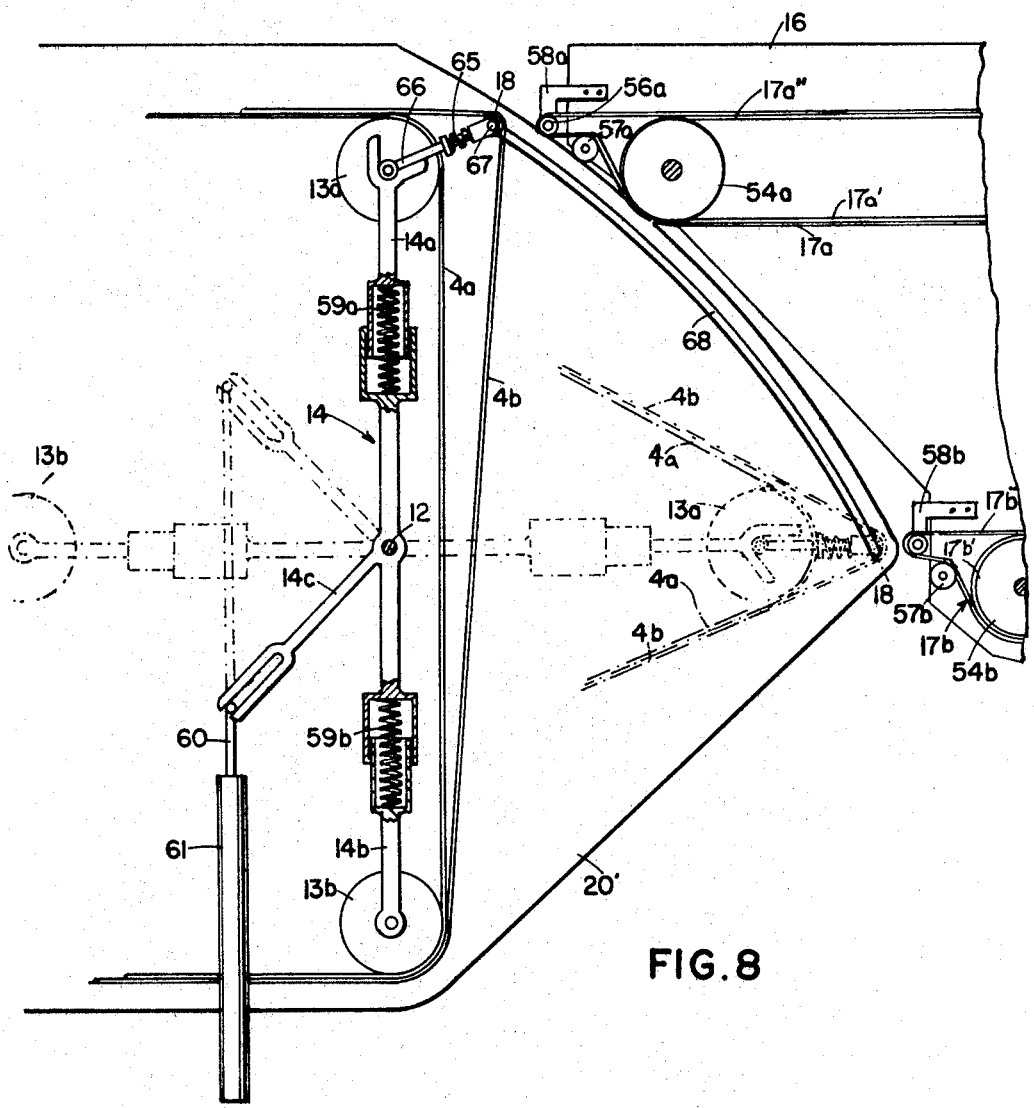
FIG. 8 is a detail view of part of the system of FIGS. 5–7.

The apparatus shown in FIGS. 1–4 comprises a frame of which only one side wall 20 and connecting bars 21, leading to the other side wall (not shown), have been illustrated. Journaled in the side walls 20 are a fixedly positioned drive and deflecting roller 22 at the input end of conveyor 2, a pair of similarly fixed deflecting rollers 25, 26 (the latter of them driven) at the output end of conveyor 4, and a further deflecting roller 8 forwardly of rollers 25, 26 underneath the horizontal stretch of conveyor 2, along with a pair of idler rollers (23, 24) bearing externally upon conveyor 2. A compensating roller 5, engaging the band of conveyor 2 at the lower end of a depending branch thereof between idler rollers 23 and 24, is vertically displaceable on an arm 27 in a bracket 28 on each of the walls 20 and is urged downwardly by springs 29, 30 to maintain the band under tension. A horizontally shiftable carriage 31, guided on ways 32 secured to the walls 20 of the machine frame, has journaled to it a deflecting roller 6 defining the output end of conveyor 2, another deflecting roller 7 defining the input end of conveyor 4 and a compensating roller 33 for the latter conveyor positioned outside the loop thereof. A wedge-shaped bridge piece 9 is pivoted at 34 to the walls of carriage 31.

Conveyor 2 is driven at constant speed from a motor 35 which is coupled, via a transmission schematically indicated at 36, with the feed roller 22 as conveyor 4 is driven from a motor 37 via a transmission 38 which actuates the feed roller 26 and includes a speed changer 39 having two output speeds of which the lower one is so related to that of motor 35 that the rate of advance of the conveyors 2 and 4 will be the same. Carriage 31 is tied to the piston 40 of a hydraulic cylinder 41 so as to be displaceable, under pressure of a fluid from a source 47, in one or the other direction as determined by a valve-type controller 42. Both the speed changer 39 and controller 42 are actuated, via a transmission indicated schematically at 43, by a sensor 44 whose feeler 45 detects, mechanically or otherwise, the gaps 46 between successive sheets 1a, 1b, 1c carried on the upper surface of primary conveyor 2.

The elements 6, 7 and 9 supported by carriage 31 constitute a horizontally reciprocable junction between the conveyors 2 and 4, the width of this junction being a small fraction of the spacing of successive intersheet gaps 46. In the position of FIG. 1, in which the first sheet 1a rests entirely on transit conveyor 4 while two other sheets 1b, 1c are supported on the combination of primary conveyor 2 and bridge piece 9, sensor 44 switches the speed changer 39 from its low to its high output speed while operating the controller 42 so as to admit fluid from pump 47 into the left-hand side of hydraulic cylinder 41. The carriage 31 now begins to move toward the right, at a rate equal to the surface speed of conveyor 2, whereby the leading edge of sheet 1b remains aligned with the output end of wedge 9 as illustrated in FIGS. 2 and 3 which show the forward stroke of the carriage. The length of this stroke, as will be apparent from a comparison of FIGS. 1 and 3, equals approximately half the length of a sheet; conveyor 4 in its high-speed condition advances at more than twice that rate so that, since the carrying surface of this conveyor has a maximum length (FIG. 1) about equal to that of a sheet, the first sheet 1a is discharged from that conveyor by the time the position of FIG. 3 is reached. It will be noted that compensating roller 5 is progressively lifted, against the force of its springs 29 and 30, to maintain the length of the loop of conveyor 2 substantially constant.

The return stroke of piston 40, initiated by a suitable timing mechanism in controller 42, occurs at a somewhat accelerated rate so that the system returns to the position of FIG. 1 while the sheets 1b, 1c and 1d shown in FIG. 3 advance along conveyor 2, as illustrated in FIG. 4, by about one fourth of their length. At the beginning of this return stroke, i.e. in the position of FIG. 3, the controller 42 restores the speed changer 39 to its low-speed condition so that the forward sheet 1b does not experience any lengthening upon passing from primary conveyor 2 onto transit conveyor 4. In the final stage of operation, which may account for about a quarter of the duration of a cycle, the piston 40 remains stationary while the sheet 1b passes completely onto the conveyor 4 in the manner illustrated for the sheet 1a in FIG. 1.

The system shown in FIGS. 5–8 is generally similar to that of FIGS. 1–4, its primary conveyor 2' being substantially identical with conveyor 2 of the preceding embodiment while its transit conveyor 4' is slightly modified as compared with conveyor 4. Rollers 5', 6', 7', 8', 22', 23' and 24' correspond to rollers 5–8 and 22–24 of the earlier figures; the feed roller 26' for conveyor 4' is shown positioned below roller 8'. Motors 35' and 37', speed changer 39', controller 42' and cylinder 41' with piston 40' have essentially the same functions as the corresponding elements in FIGS. 1–4; piston 40' is connected with a carriage 31' slidable on rolls 32' which in turn are supported on the side walls 20' of the machine frame.

The shiftable rollers 6' and 7' of conveyors 2' and 4', as well as the compensating roller 33' for the latter conveyor, are journaled on the carriage 31' to define the conveyor junction 3'. Conveyor 4' is composed of an inner layer 4a and an outer layer 4b, layer 4a being of greater carrying capacity and spanning the rollers 7', 8', 26' as well as two further rollers 13a, 13b on the extremities 14a, 14b of a double-armed lever 14; layer 4b avoids the roller 13a and passes, instead, around an auxiliary roller 18 of substantially similar diameter disposed forwardly of the roller 13a and on a level therewith. A tongue 9', spanning the width of the carriage 31', acts as a bridge piece between rollers 6' and 7' at the junction 3'.

A set of hoppers 48a, 48b, 48c deposit a pile of dampened fiber or similar sheet-forming material onto the carrying surface of conveyor 2', the resulting layer 1 being smoothed by one or more rollers 49 and doctor blades 50 before being cut into discrete sheets 1a', 1b' etc. by a slicing mechanism here shown as a blade 51;

this blade is hinged to an endless chain 52 which passes around several sprockets 53, of which at least one is driven so as to follow the motion of the advancing layer. Motor 35' operates the chain 52, and the feed roller 52' and the controller 42' in the proper synchronism so that the forward stroke of carriage 31' is started as soon as a sheet, such as the layer section 1a' in FIG. 5, rests in its entirety on the carrying surface of conveyor 4'. The contraction of this carrying surface with concurrent acceleration of this conveyor, accompanied by a corresponding lengthening of the carrying surface of conveyor 2', and the subsequent reversal of the carriage stroke, with concurrent reduction in the speed of conveyor 4', all proceed in the manner previously described.

The output end of conveyor 4', defined by rollers 13a and 18, is selectively alignable with either of two pick-up conveyors 17a and 17b on respective levels 15a, 15b of a rack 15 provided with side walls 16 (only one shown). Journaled in these side walls are the deflecting rollers 54a, 55a and 54b, 55b of conveyors 17a and 17b, either or both rollers of each pair being preferably driven to advance the conveyor bands at a rate corresponding to that of conveyor 4' in its high-speed condition; these conveyors may, however, also be of the nondriven kind. The bands of conveyors 17a and 17b are also shown to be composed of inner and outer webs 17a', 17a" and 17b', 17b", the outer webs 17a" and 17b" passing around reduced auxiliary rollers 56a, 56b as well as idler rollers 57a, 57b. All the rollers except auxiliary rollers 56a, 56b are journaled on the side walls 16 of rack 15; the rollers 56a and 56b are supported on pairs of brackets 58a, 58b projecting rearwardly from these walls.

The rollers 13a and 13b are urged outwardly by springs 59a, 59b in the telescoped arms 14a, 14b of lever 14 on opposite sides of its fulcrum 12. A third arm 14c is articulated to a piston 60 which is vertically displaceable in a hydraulic cylinder 61, the associated controller 62 being actuated by motor 35' via a transmission 63. The relationship between this latter transmission and the transmission 64, leading to controller 42', is such that piston 60 operates only once, either upwardly or downwardly, during each reciprocating cycle of piston 40'; this operation occurs after each forward stroke of the carriage 31', i.e. after the conveyor 4' has delivered a sheet to one or the other of the conveyors 17a, 17b. The auxiliary roller 18 is also displaceable, urged outwardly by a spring 65, to the extent necessary to keep the web 4b under tension, on an arm 66 which is limitedly swingable relatively to lever arm 14a; the shaft 67 of roller 18 is guided in a slot 68 of each side wall 20' so that this roller will be compelled to assume the positions shown in FIGS. 5 and 7 as the lever 14 rotates through 90° between the positions illustrated in FIGS. 5 and 6, on the one hand, and FIG. 7, on the other.

It will be understood that the lever 14 with its extension 66 will be duplicated on opposite sides of the conveyor 4' adjacent respective side walls 20'.

The tongue 9' may, if desired, be replaced by an auxiliary roller similar to those shown at 18, 57a, 57b, supported on carriage 31' and surrounded by an outer layer of the band conveyor 2', in a manner strictly analogous to that described for the conveyors 4', 17a and 17b.

My invention is, of course, not limited to the specific embodiments described and illustrated, but may be realized in various modifications without departing from the spirit and scope of the appended claims.

I claim:

1. An apparatus for conveying from a point of origin to a destination point a succession of sheets of predetermined length, separated at said point of origin by narrow gaps, so as to increase the size of said gaps at said destination point, comprising a first conveyor and a second conveyor in end-to-end line with said first conveyor, constant-speed drive means for said first conveyor, variable-speed drive means for advancing said second conveyor at a low speed and a high speed, said low speed being substantially equal to that of said first conveyor, switch means coupled with said variable-speed drive means for changing from said high speed to said low speed and vice versa, said second conveyor having an input end displaceable in the direction of conveyor motion, and control means for reciprocating said input end between a first position relatively close to said point of origin and a second position relatively remote from said point of origin at a forward speed substantially equaling said low speed and at a return speed at least equal to said forward speed, said control means being coupled with said switch means for maintaining said second conveyor at said high speed during the forward stroke of reciprocation and at said low speed during the return stroke thereof.

2. An apparatus for conveying from a point of origin to a destination point a succession of sheets of predetermined length, separated at said point of origin by narrow gaps, so as to increase the size of said gaps at said destination point, comprising a first conveyor and a second conveyor in end-to-end line with said first conveyor, said conveyors having adjoining ends separated by a small fraction of said length, constant-speed drive means for said first conveyor, variable-speed drive mean for advancing said second conveyor at a low speed and a high speed, said low speed being substantially equal to that of said first conveyor, switch means coupled with said variable-speed drive means for changing from said high speed to said low speed and vice versa and control means for concurrently reciprocating said adjoining ends between a first position relatively close to said point of origin and a second position relatively remote from said point of origin at a forward speed substantially equaling said low speed and at a return speed at least equal to said forward speed, said control means being coupled with said switch means for maintaining said second conveyor at said high speed during the forward stroke of reciprocation and at said low speed during the return stroke thereof.

3. An apparatus for conveying from a point of origin to a destination point a succession of sheets of predetermined length, separated at said point of origin by narrow gaps, so as to increase the size of said gaps at said destination point, comprising a first conveyor and a second conveyor in line with said first conveyor, constant-speed drive means for said first conveyor, variable-speed drive means for advancing second conveyor at a low speed and a high speed, said lower speed being substantially equal to that of said first conveyor, switch means coupled with said variable-speed drive means for changing from said high speed to said low speed and vice versa, said second conveyor having an input end displaceable in the direction of conveyor motion, and control means for reciprocating said input end between a first position relatively close to said point of origin and a second position relatively remote from said point of origin at a forward speed substantially equaling said low speed and at a return speed at least equal to said forward speed, said positions being spaced apart by substantially half the distance of said gaps, the cycle of reciprocation of said end as established by said control means being of a duration substantially equal to the transit time between said gaps at said low speed, said control means being coupled with said switch means for maintaining said second conveyor at said high speed during the forward stroke of reciprocation and at said low speed during the return stroke thereof.

4. An apparatus for conveying from a point of origin to a destination point a succession of sheets of predetermined length, separated at said point of origin by narrow gaps, so as to increase the size of said gaps at said destination point, comprising a first conveyor and a second conveyor in end-to-end line with said first conveyor, said conveyors having adjoining ends separated by a small fraction of said length, constant-speed drive means for said first conveyor, variable-speed drive means for advancing said second conveyor at a low speed and a high speed, said low speed being substantially equal to that of said first conveyor, switch means coupled with said variable-speed drive means for changing from said high speed to said low speed and vice versa, and control means for concurrently reciprocating said adjoining ends between a first position relatively close to said point of origin and a second position relatively remote from said point of origin at a forward speed substantially equaling said low speed and at a return speed at least equal to said forward speed, said positions being spaced apart by substantially half the distance of said gaps, the cycle of reciprocation of said ends as established by said control means being of a duration substantially equal to the transit time between said gaps at said low speed, said control means being coupled with said switch means for maintaining said second conveyor at said high speed during the forward stroke of reciprocation and at said low speed during the return stroke thereof.

5. An apparatus according to claim 4 wherein each of said conveyors comprises an endless band and guide means therefor, said guide means including a pair of shiftable deflecting elements at said adjoining ends coupled with said control means and fixedly positioned deflecting elements at locations remote from said ends.

6. An apparatus according to claim 5 wherein said deflecting elements include a shiftable and a fixedly positioned end roller at opposite ends of said conveyors defining carrying surfaces of adjustable length therebetween.

7. An apparatus according to claim 6 wherein said deflecting elements further include a shiftable compensating roller for each of said conveyors offset from said carrying surfaces.

8. An apparatus according to claim 7 wherein said compensating roller of at least one of said conveyors is spring-loaded for maintaining the band thereof under tension.

9. An apparatus according to claim 7 wherein said compensating roller of at least one of said conveyors is coupled with said control means for displacement concurrently with said shiftable end rollers in a direction parallel to said carrying surfaces.

10. An apparatus according to claim 6 wherein said band of at least one of said conveyors includes an inner layer hugging said end rollers and an outer layer displaceable relatively to said inner layer, said guide means including an auxiliary roller adjacent one of said end rollers but of relatively reduced diameter embraced by only said outer layer.

11. An apparatus according to claim 10 wherein said outer layer is of reduced thickness in comparison with said inner layer.

12. An apparatus according to claim 6, further comprising a bridge member level with said carrying surfaces between said adjoining edges, said bridge member being linked with said shiftable end rollers for displacement therewith.

13. An apparatus according to claim 4, further comprising receiving means for said sheets positioned beyond said second conveyor adjacent the terminal end thereof, said receiving means including at least one further conveyor and means for driving said further conveyor at substantially said high speed.

14. An apparatus according to claim 4, further comprising a hopper for continuously depositing a particulate material on said first conveyor to form said sheets, smoothing means for leveling the deposited material into a continuous layer, and slicing means periodically operable to cut said layer into said sheets, said slicing means being coupled with said control means for so timing the cutting of said layer that a sheet is positioned substantially in its entirety on said second conveyor upon changeover from said low speed to said high speed.

No references cited.

EARL M. BERGERT, *Primary Examiner.*

W. E. HOAG, *Assistant Examiner.*